(12) United States Patent
Leymann et al.

(10) Patent No.: US 7,406,483 B2
(45) Date of Patent: Jul. 29, 2008

(54) PROVISIONING OF SOFTWARE COMPONENTS VIA WORKFLOW MANAGEMENT SYSTEMS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/845,536

(22) Filed: May 13, 2004

(65) Prior Publication Data
US 2005/0049906 A1 Mar. 3, 2005

(30) Foreign Application Priority Data
Sep. 2, 2003 (EP) ................... 03103270

(51) Int. Cl.
*G06F 7/00* (2006.01)
*G06F 17/00* (2006.01)
(52) U.S. Cl. ................................... 707/104.1
(58) Field of Classification Search ......... 707/101–103, 707/203, 104.1
See application file for complete search history.

(56) References Cited
U.S. PATENT DOCUMENTS
6,381,742 B2 * 4/2002 Forbes et al. ............. 717/176

2001/0029605 A1 * 10/2001 Forbes et al. ............. 717/11
2002/0144248 A1 * 10/2002 Forbes et al. ............. 717/167

* cited by examiner

*Primary Examiner*—Jeffrey Gaffin
*Assistant Examiner*—Michael J Hicks
(74) *Attorney, Agent, or Firm*—Duke W. Yee; Herman Rodriguez; Gerald H. Glanzman

(57) ABSTRACT

For a software component to be installed on a target computer system a product dependency graph is determined which identifies additional software components required by the to-be-installed software component as prerequisite or corequisite software components. For each of these software components a corresponding installation facility is determined. Then a process model is generated being executable by a Workflow Management System (WFMS). The WFMS process model comprises a directed graph of activities, wherein each software component of the product dependency graph is associated with an activity such that when the activity is executed the installation facility corresponding to each of the software components is performed. Moreover, the WFMS process model is generated in a way that the sequence of activities in the directed graph is not violating the dependencies of the software components in the product dependency graph. Finally the WFMS process model is inserted in the WFMS as the provisioning process.

9 Claims, 6 Drawing Sheets

PROVISIONING OF SOFTWARE COMPONENTS VIA WORKFLOW MANAGEMENT SYSTEMS

BACKGROUND OF THE INVENTION

1.1 Field of the Invention

The present invention relates to means and a method for automatically generating a provisioning process the provisioning process being capable to install software components on a target computer system.

1.2 Description and Disadvantages of Prior Art

A new area of technology with increasing importance is the domain of On-Demand computing. On-demand computing deals with providing IT services the same easy way as utility companies, such as electrical companies, are providing their services. A requestor would simply state the request and the companies providing the services would make them available very quickly. A typical request could look like the following: Please give me 50 four-way processors with 1000 GB storage. Each processor should run IBM WebSphere as an application server and IBM DB2 as the underlying relational database. And this should be available by end of next week. The provider of such a service then needs to setup this environment rather quickly. First, it has to find the set of processors including the disk storage. Second it has to deploy the requested software onto the selected processors. The complete set of components that can be deployed is described via one or more product trees which identify the components and their dependencies. An administrator selects the components that need to be installed. Based on the selection made by the administrator a provisioning manager determines which components need to be installed in which sequence on which processor.

Therefore new technologies are required to simplify and to accelerate the development of provisioning managers.

1.3 Ojective of the Invention

The invention is based on the objective to provide a technology for automatically generating a provisioning manager being capable to install a software component on a target computer system.

SUMMARY AND ADVANTAGES OF THE INVENTION

The objectives of the invention are solved by the independent claims. Further advantageous arrangements and embodiments of the invention are set forth in the respective subclaims.

The current invention relates to a technology for automatically generating a provisioning process model as part of Workflow Management System or system with comparable functionality (WFMS), the provisioning process model being capable to install a software component on a target computer system.

For one or a multitude of software components to be installed on a target computer system a product dependency graph is determined which identifies additional software components required by the to-be-installed software components as prerequisite or corequisite software components. For each of the software components in the product dependency graph a corresponding installation facility is determined. Then a process model is generated being executable by a Workflow Management System or a computer system with comparable functionality (WFMS). The WFMS process model comprises a directed graph of activities, wherein each software component of the product dependency graph is associated with an activity such that when the activity is executed the installation facility corresponding to each of the software components is performed. Moreover, the WFMS process model is generated in a way that the sequence of activities in the directed graph is not violating the dependencies of the software components in the product dependency graph. Finally the WFMS process model is inserted in the WFMS as the provisioning process.

The fundamental observation of the current invention is that the functions normally provided by a provisioning manager can be generated automatically if this is done by generating a process model of a WFMS. With this approach it is sufficient to generate the overall control flow while the already available functionality of a WFMS can be exploited for finally performing the control at execution time of such a process model. Using a workflow management system provides several significant advantages: First it not only eliminates the need for writing of the provisioning manager, which in itself is a major effort, but also the maintenance associated necessary for keeping the provisioning manager up and running. Second, it allows exploiting any features offered by the workflow management system, such as compensation, functions normally not offered by a state-of-the-art provisioning manager. Thus, summarizing the proposed teaching has several significant advantages over the state-of-the-art approach:

1. There is no need to develop a provisioning manager from scratch as the workflow-management-system provides the basic functions needed.
2. The additional functions offered by a workflow-management-system can be advantageously exploited; typical functions are the support of people-facing activities or the use of compensation in the sense of WFMS (as discussed in further details below).
3. The administrative and systems management interface of the workflow-management-system provides administrative and systems management people with a consistent end user interface.
4. The usage of a workflow-management-system for all tasks to be carried out, including provisioning, provides the capability to perform a common workflow management that encompasses provisioning.

DESCRIPTION OF THE PREFERRED EMBODIMENT

Figure 1:
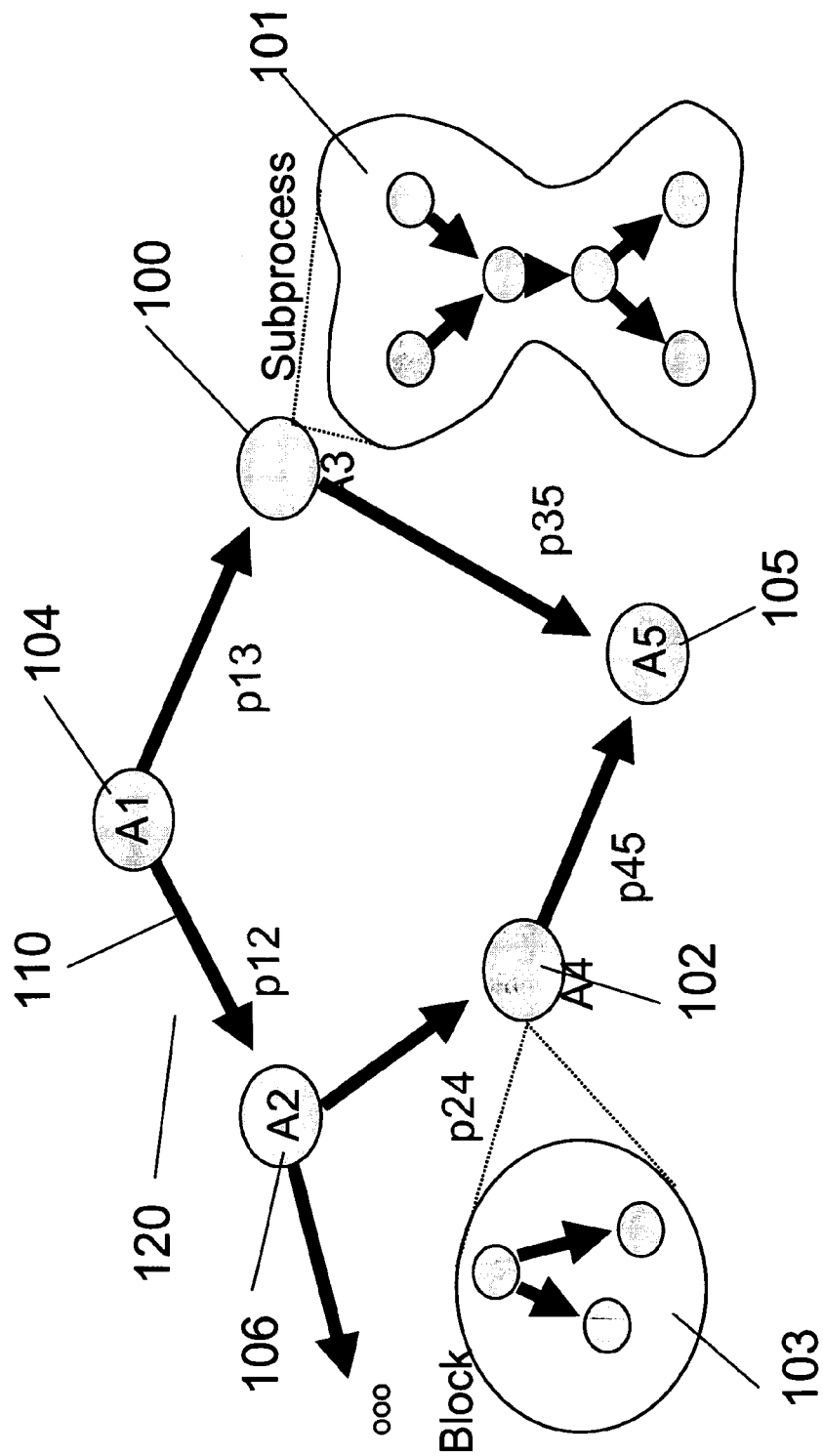
FIG. 1 shows a business process model represented by a process graph according to the state of the art.

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on IBM's "MQSeries Workflow" workflow management system. Of course any other WFMS could be used instead. Furthermore the current teaching applies also to any other type of system, which offers WFMS functionalities not as a separate WFMS but within some other type of system.

A resource according to the current invention may refer to any type of entity which can be managed by a computer system. Some simple examples are: CPU cycles, memory, devices, disks and the like.

4.1 Introduction To Workflow Management Systems (WFMS)

The current invention is illustrated based on workflow management technology has provided for instance by IBM's "MQSeries Workflow" WFMS. Of course any other WFMS could be used instead. Furthermore the current teaching applies also to any other type of system, which offers WFMS functionalities not as a separate WFMS but within some other type of system. It should also be noted that the meta model being used by "MQSeries Workflow" is a typical meta model used by workflow-management-systems; however any other meta model can be used as well.

4.1.1. Fundamental Structure of a WFMS

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMS facilitates the management of business processes. It provides a means to describe models of business processes (build time) and it drives business processes based on an associated model (runtime). The meta model of IBM's WFMS MQSeries Workflow, i.e. the syntactical elements provided for describing business process models, and the meaning and interpretation of these syntactical elements, is described next. It should be noted that the meta-model of MQSeries Workflow is just a particular way of representing business processes; other meta-models, such as Petri Nets do exist. It should however also be noted that process graphs are the typical way of representing business processes in all of these approaches.

In MQSeries Workflow business processes are modeled as directed, acyclic, colored, and weighted graphs. The nodes of the graph represent the activities that need to be carried out and the edges of the graph the control connectors that describe the potential sequence in which the activities are to be carried out.

Thus a process model is a complete representation of a business process, comprising a process diagram and the settings that define the logic behind the components of the diagram.

Activities are the fundamental elements of the meta model. An activity represents a business action that is from a certain perspective a semantic entity of its own.

It should be noted that the distinction between activity and activity implementation must not necessarily be reflected in the underlying meta model; however from a conceptual point of view each activity is associated with an activity implementation. The activity implementation is typically a piece of code that performs the necessary action associated with the activity. Insofar the activity is the abstract representation of an activity implementation performing that particular business activity.

The flow of control, i.e. the control flow through a running process determines the sequence in which activities are executed. The MQSeries Workflow workflow manager navigates a path through the process that is determined by the evaluation to TRUE of start conditions, exit conditions, and transition conditions.

As an example of such a process model FIG. 1 shows schematically the structure of such a process graph. Activities (A1 up to A5) are represented as named circles; the name typically describes the purpose of the activity. Activities come in various flavors to address the different tasks that may need to be performed. They may have different activity implementations to meet these diverse needs. Program activities are performed by an assigned program, process-activities like for instance 100 are performed by another process 101, and blocks like for instance 102 implement a macro 103 with a built-in do-until loop. Control connectors P12, . . . , P45 are represented as arrows; the head of the arrow describes the direction in which the flow of control is moving through the process. For instance, the control connector 110 defines that activity A1 104 should be followed by activity A2 106. Transition conditions, such as pl2 120, determine whether the control connector is actually been followed in a particular process instance. The activity where the control connector starts is called the source activity; where it ends is called the target activity. When more than one control connector leaves an activity, this indicates potentially parallel work. Activities that have no incoming control connectors, such as activity A1

104, are called start activities; activities that have no outgoing control connector, such as activity A5 105, are called end activities.

4.1.2 Activities

Figure 2:
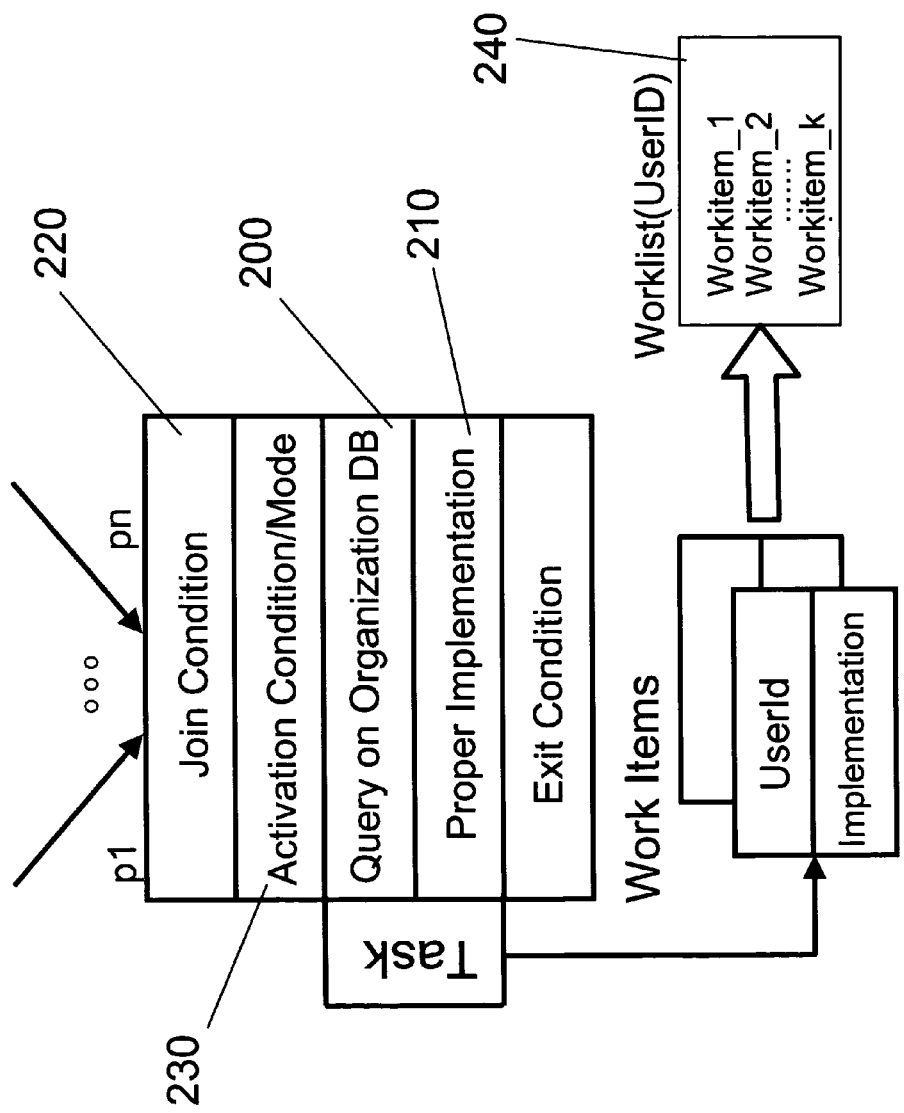
FIG. 2 depicts the fine structure of an activity within a WFMS.

FIG. 2 shows the inner structure of program activities and indicates what is being done in the individual parts of an activity.

As the processing of the incoming control connectors with their associated logical predicates p1, . . . , pn is not of importance for the current invention a detailed description this feature is skipped.

The query on organization database (200) and proper implementation (210) form the core of the activity.

The query against the organization database specifies in organizational terms which employee should carry out the activity. Since people in the organization are typically called staff, this query against the organizational database is also called a staff query. When the activity is ready for processing, this query is carried out and returns a set of users that are assigned to the activity. The process of finding the appropriate people is called staff resolution.

The proper implementation specifies what is used to carry out the activity and how it is to be carried out. The implementation could be a program that is executed or another process that is invoked.

The combination of the proper implementation and the query against the organization database is called a task. When the activity needs to be carried out, staff resolution returns the list of users that need to be assigned to the activity. Multiple users may be selected for an activity based on the theory, that the more people know that a work request requires their action; the more likely it is that the work request is performed soon. The workflow management system ensures that eventually only one user performs the requested work. The workflow management system then builds for each user a work item consisting of the user identification and the proper implementation. A user then uses the work item to launch the appropriate implementation. Facilities provided by the workflow management system allow the user to organize work items with the same characteristics into work lists (240).

Figure 3:
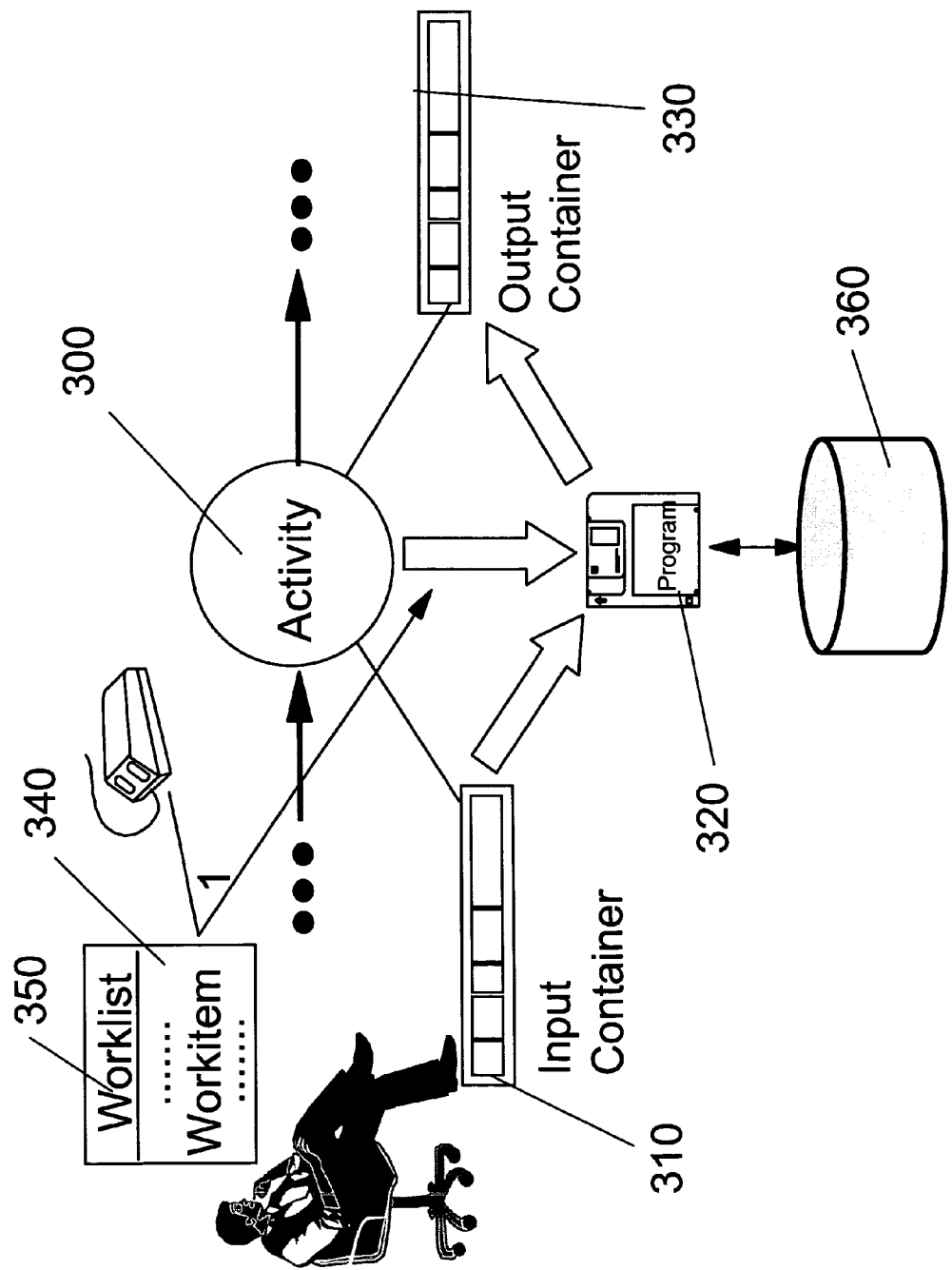
FIG. 3 shows the typical steps that are performed when an activity within a process graph is being carried out by a WFMS.

FIG. 3 illustrates the typical execution of a program activity. It is assumed that the activity is a manual activity that means that a user must start it (in contrast to automatic ones, which can be executed by the system without any user interaction and thus are started by the WFMS automatically).

When the user clicks on a work item (340) on one of his work lists (350), the workflow management system builds the input container (310) for the activity (300). Then, the workflow management system invokes the program (320), i.e. the activity implementation. The program obtains the necessary information from the input container, performs the necessary actions such as interacting with the user or accessing a database (360), puts any new data into the output container (330), and then returns to the workflow management system. The workflow management system evaluates the exit condition (250); if the exit condition evaluates to true, navigation continues. If the exit condition fails, the work item reappears again on the work list so that the user can continue the activity later.

If the activity is an automatic activity, the same actions are performed by the workflow management system. However, the activity implementation is started automatically.

4.1.3 Scopes

Scopes (also called spheres) are sets of activities that have some property in common. Scopes can be nested with the enclosing scope called an outer scope and an included scope called an inner scope. To the extreme one could even allow for overlapping scopes. A typical example of a common property is data that is shared between the different activities within of common scope; something that could be called local data. The data is created when the flow of control enters the scope. No activities outside the scope can see the data in the scope. All activities in the scope can modify the data in the scope as well as all data in the outer scopes. If a data item in an inner scope has the same name as a data item in an outer scope, the activities in the inner scope just see the inner scope data item.

4.1.4 Compensation

In workflows, particularly long running workflows, undoing work that has been carried out is not as simple as just throwing away the work that has been done since a particular checkpoint and then restarting at the checkpoint. The workflow management system has to undo the effects (including any hidden side effect) of the activities that have been carried out by invoking compensation activities in the reverse-order of execution. Let's assume, we have three activities A, B, and C, that are carried out in the sequence A, B, and C. Furthermore let's assume the requirement that either all of them complete successfully or none of them. If C fails, then A and B need to be undone; that means the effects of A and B need to be undone. This is normally achieved by defining compensation activities CA and CB and running those if the effects of A and B need to be compensated.

As A has been carried out before B, CB is carried out before CA.

4.1.5 Notification

It is very important that a business process completes as fast as possible. Thus it is important that peoples are informed whenever a process does not complete in a specified period of time. This process of making people aware that a process, an activity, or even a set of activities, exceeds a specified time, is called notification.

4.1.6 Fault Handling

There are situations where an error possibly unexpected that needs to be handled. This is the purpose of fault handlers that get control whenever an error occurs. It will be then up to the business process designer to describe within the fault handler what should be done to recover from the error; for example, by informing an administrator to do some manual corrections.

4.2 Provisioning

Provisioning is the installation of a set of components on one or more computer systems with the goal of establishing a particular, typically customer specified infrastructure. This infrastructure provides the requesting client to carry out desired work. Provisioning can be understood as a set of activities that are needed to establish a desired system setup on one or more computer systems (target system). Establishing the system setup is achieved by deploying a set of computer programs and possibly additional hardware on the one or more computer systems. Typically the different components have dependencies on each other; that means components may require that other components be deployed first. These dependencies can be understood as a product dependency graph identifying as a directed graph for each component additionally required components representing prerequisite or corequisite components.

If within such a product dependency graph a connector is pointing from component A to component B ("A is preceding B") this expresses that component B prerequisites component A (and of course all other components directly or indirectly preceding component A as well). Of course it is a different question how this product dependency graphs are represented as this is to be understood as a conceptual approach only. Thus a product dependency graph may indeed be implemented using some graph techniques; another extreme approach could be to generate the product dependency graph by data/text mining technologies "On-the-fly" from product descriptions available in computer readable form.

In many special cases the product dependency graphs can be reduced to product dependency trees or product trees for short. Such a simplification of the graphical relationship between components is possible in these cases wherein every component requires a single prerequisite component only; in other words, none of the components requires multiple independent components.

Provisioning one or more computer systems with a user-specified set of software components starts with the definition of a product dependency graph which identifies the set of components that need to be installed and the dependencies between the various components. One could assume that service providers have a set of product dependency graphs from which a requester would choose: this could either be the deployment of a complete product dependency graph or just a sub-graph of a product dependency graph.

Typically specialized programs, called provisioning managers, process the product dependency graph when a particular set of computer systems needs to be provisioned.

Figure 4:
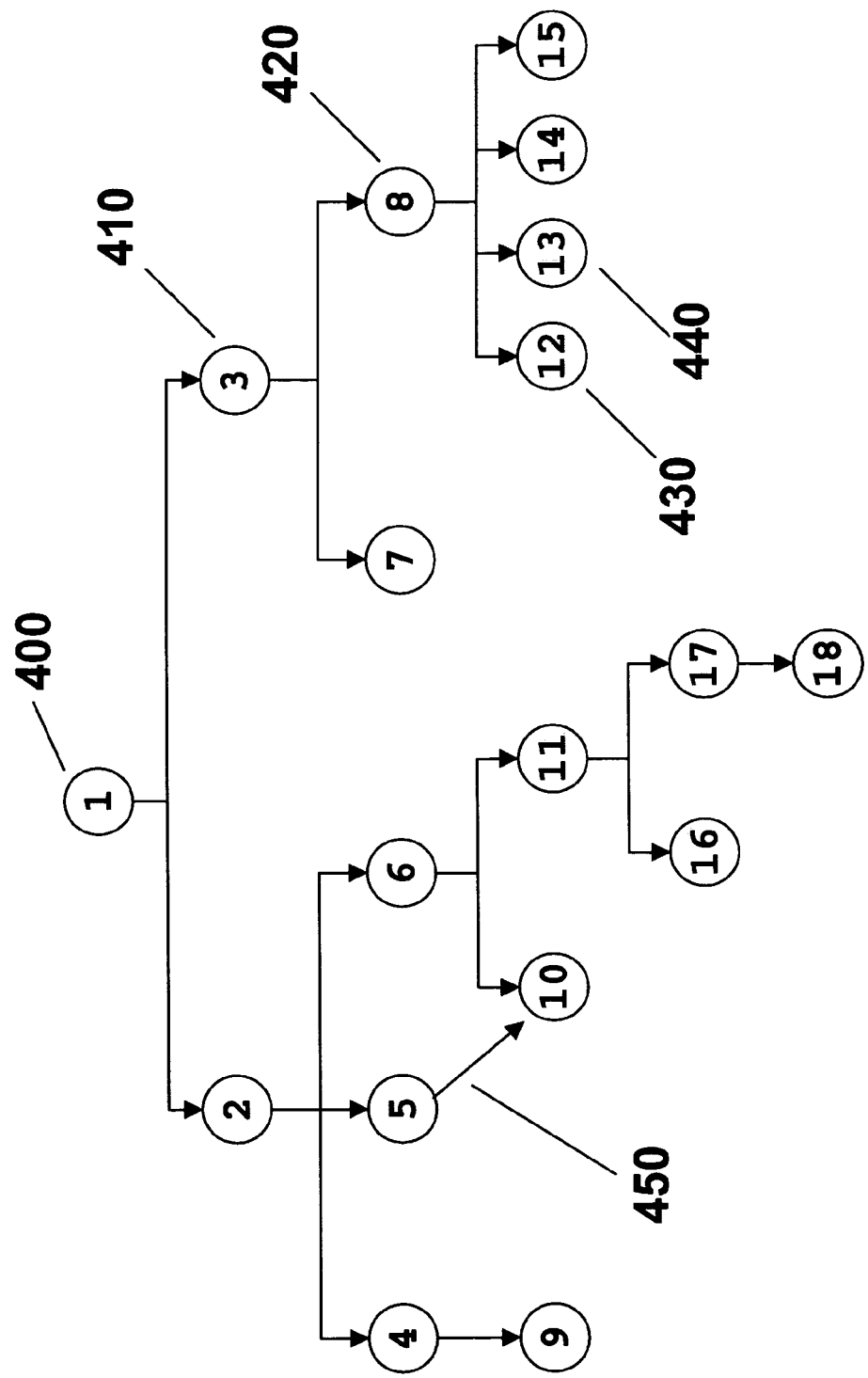
FIG. 4 shows a part of a business process with resources required by each of the activities/activity implementations.

The set of components that need to be installed is specified via a product dependency graph as shown in FIG. 4. The nodes in the tree represent the individual components that need to be installed; the branches define the dependencies between the components. For example, components 12 and 13 (430, 440) require that component 8 (420) is installed first. Component 8 (420) requires that component 3 (410) is installed first, which itself requires that component 1 (400) is installed first. Component 10 requires 2 separate components, component 5 and 6; thus form from the perspective of component 10 component 5 and component 6 are corequisites. If the directed link (450) from component 5 to component 10 would not be present the product dependency graph would reduce to a product tree.

Each node defines the mechanism, typically the name of an installation script or routine or some program capable of installing that particular component. By abstracting from the concrete technology used to implement such an installation mechanism we also use the term installation facility for this mechanism. Installation of a component is then performed by running the installation facility. Typically an installation facility requires a set of parameters that identify to the script where, for example, to put files or in general which customize the installation process. These installation parameters are either specified for a particular component or are inherited from components that are pre-requisite for a component. Parameters that are specified on the product tree level are called global parameters. Typically, the general set of parameters is called installation context.

It should be noted, that the product tree representation provides the same information as the traditional software architecture picture, where the different components are shown layered above each other with the lower level being pre-requisite for the higher level ones.

4.3. Creating Workflows

The fundamental observation of the current invention is that the functions normally provided by a provisioning manager can be generated automatically if this is done by generating a process model (representing the provisioning process) of a WFMS. According to the current invention the product dependency graph is transformed into a process model by translating the dependencies between the different components into sequential and parallel execution paths in the process model. This process model is then handed over to the workflow-management-system either for further refinement or for direct execution. Based on this approach standard workflow management systems can be used for provisioning. Moreover, this allows that the functions offered by a workflow management system can be exploited advantageously also for a provisioning process.

Figure 5:
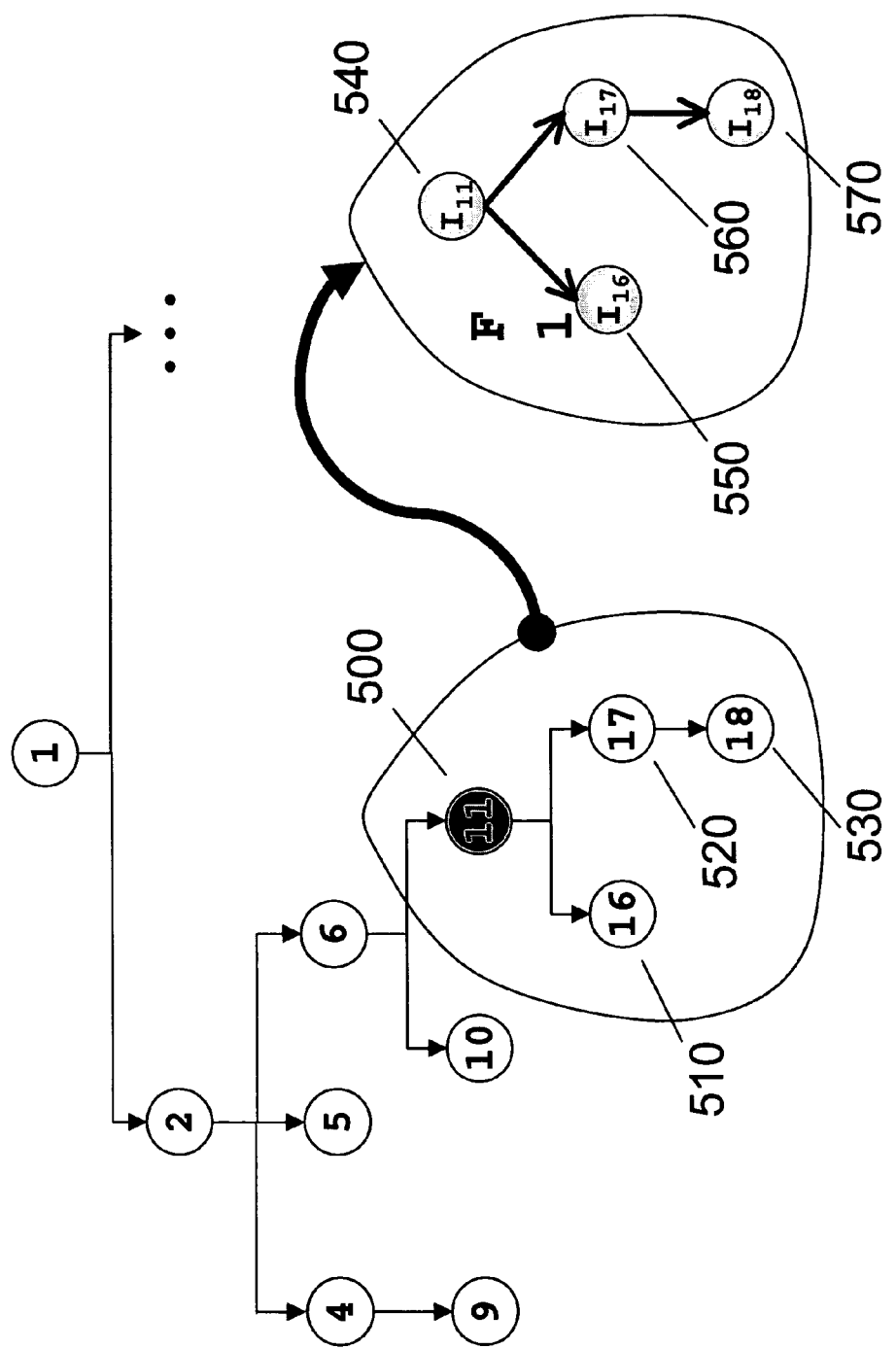
FIG. 5 shows the important actions of the workflow management system when carrying out the part of a business process shown in FIG. 4; specific focus is given to the aspect that it is the WFMS itself requesting allocation of required resources on behalf of and in advance of starting execution of the activities.

FIG. 5 illustrates how a provisioning process can be generated automatically as a process model of a workflow management system generated from a product dependency graph. In the specifc case of the example of FIG. 5 is limited to a product dependency graph reduced to a product tree; of course the current teaching can be applied to product dependency graphs of every type. In particular, it shows how a workflow is generated from a part of the tree. Components that are pre-requisite for other ones are represented by activities preceding other components. For example, component 11 (500) which is pre-requisite for component 16 (510) is represented as activity I11 (540) preceding activity I16 (550) which represents component 16 (510). Components that have the same set of pre-requisites, such as components 16 and 17 (510, 520) are modeled as parallel activities I16 and I17 (550, 560).

Of course there is a certain amount of freedom how a product dependency graph is mapped into a corresponding provisioning process model. In the example of FIG. 5 an approach has been chosen which allows for a maximum of parallelism when the process model will be executed by the WFMS. Within parallel control paths the WFMS is free to decide (potentially depending on other conditions, like for instance workload considerations) when to assign control to the individual activities for execution.

The important point for mapping a product dependency graph onto a corresponding process model is that the directed graph of the process model is not violating the dependencies, i.e. the sequence, of the components modeled by the product dependency graph. In other words: every two components, which are mapped onto activities of a process model for the WFMS, have to be mapped such that if the first component is (directly or indirectly) preceding (i.e. is prerequisiting or corequisiting) the second component within the product dependency graph then the same statement holds also for the corresponding activities within the WFMS process model; i.e. the first WFMS activity corresponding to the first component is (directly or indirectly) preceding the second WFMS activity corresponding to the second component in terms of the process model.

Two further examples making use of the freedom of how a product dependency graph is mapped into a corresponding provisioning process model are the following. Both approaches are based on the idea to transform the process dependency graph into a linear, mere sequential arrangement of process activities. Such type of process models do have the advantage that at any point in time no two activities are executed in parallel which excludes that two activities might influence one another through some hidden side effects. Referring to the example of FIG. 6 in a first approach the sub-graph of component 2 is traversed in a depth-first traversal order and thus mapped onto the following sequence of activities:

I2, I4, I9, I5, I6, I10, I11, I16, I17, I18.

Alternatively the sub-graph of component 6 could be traversed in of breadth-first traversal order and thus mapped onto the following sequence of activities:

I2, I4, I5, I6, I9, I10, I11, I16, I17, I18.

Both of the exemplified approaches satisfy the condition that the sequence of activities in said directed graph of the process model is not violating the dependencies of the software components in the product dependency graph.

The examples shown so far map each to-be-installed component into exactly one activity of the corresponding provisioning process model. There might be situations where it is of advantage to map multiple to be installed components into a single activity. Thus generally the relationship between the to be installed components and their corresponding activities within the provisioning process model may be a 1-to-many relationship.

The example of FIG. 5 moreover depicts a further embodiment of the current invention. According to this example it is assumed that components 1, 2, 6 are installed already on the target computer system. To cope with this situation it is suggested that the product dependency graph is reduced by software components already installed on the target system; the net result is that the provisioning process reduces to the process model F1 as reflected within FIG. 5. In case components 1, 2, 6 were not installed on the target system already the resulting provisioning process would also comprise the sequence of activities I1, I2, I6 preceding activity I11 in F1.

If the components 11, 16, 17, and 18 (500, 510, 520, 530) share the same set of parameters, a scope (according to the WFMS scope concept described under 4.1.3 above) is generated having the set of parameters as local data.

Figure 6:
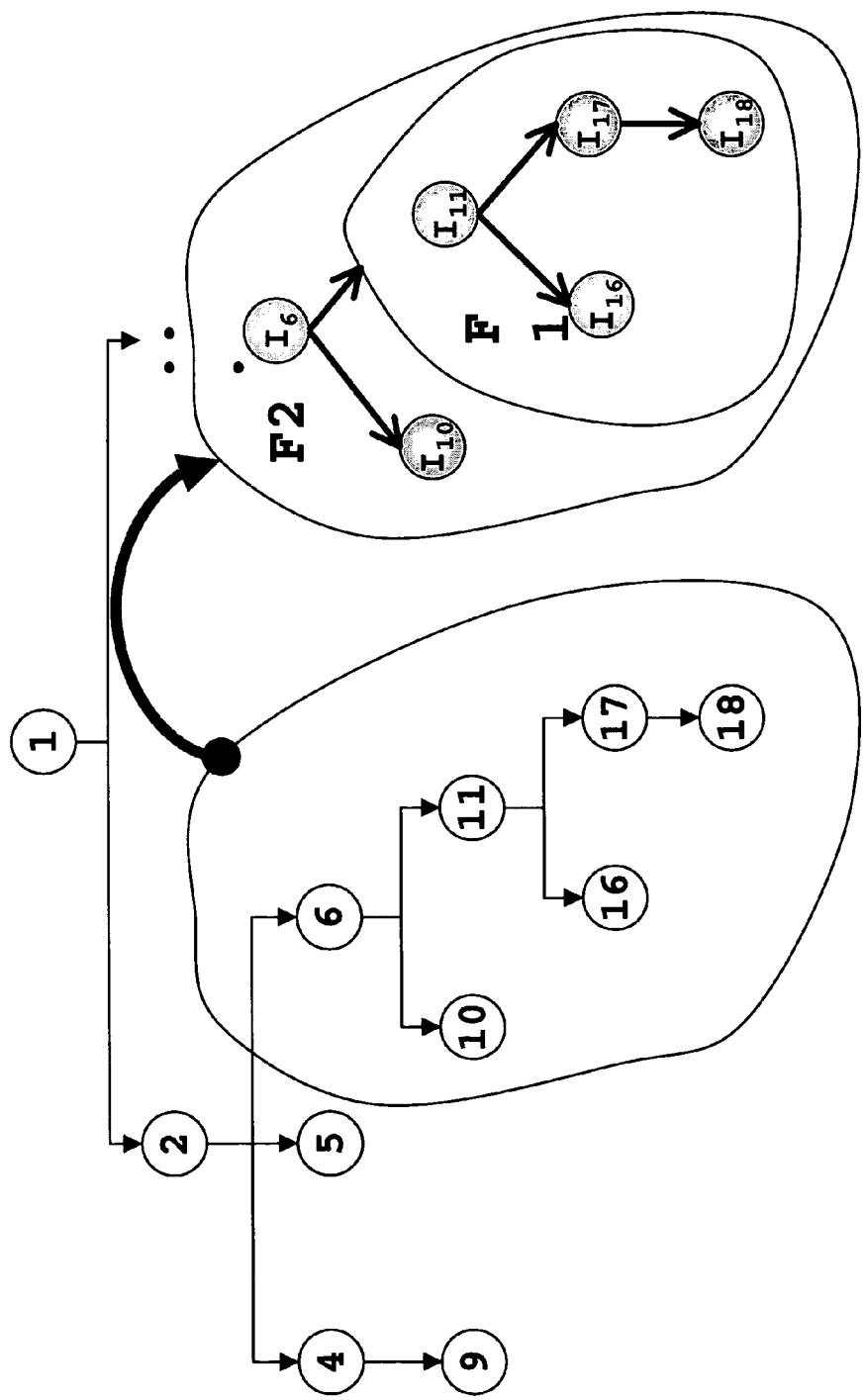
FIG. 6 illustrates how workflows can be reused.

FIG. 6 illustrates how workflows can be reused. The suggested approach is that sub-graphs within the process model are generated as subprocesses of the provisioning process.

In the context of FIG. 6 the sub-graph beyond component 11 is generated as a subprocess F1 within the overall provisioning process F2. This allows for great performance improvements when product trees are modified dynamically or even generated ad-hoc, as only the changed part of product trees need to be re-generated.

4.4. Exploiting Further Workflow Features

Moreover the following functions of workflow management systems can be advantageously exploited the within the generation approach of provisioning processes:

1. The compensation function can be used to undo parts or all of the installation if installation of a component fails. In general, an installation can be undone by running the uninstall for the component; thus the workflow management system can run default compensation undoing the installation without any further information.

For that purpose for each (or some) activity A installing a certain component a compensation activity CA is generated. As the program to actually perform the uninstall either a uninstall program being specific to that component is used or the general uninstall function provided by the underlying operating system in general is exploited.

2. The notification function can be used to speed up the provisioning of systems by alerting the person responsible for provisioning.

3. The fault handler function can be used to handle errors.

The invention claimed is:

1. A computerized method for automatically generating a provisioning process said provisioning process being capable to install at least one software component on a target system, said method comprising:

a first step of receiving a request to install a first software component;

a second step of determining a product dependency graph for said first software component, said product dependency graph identifying as a directed graph additional software components required by said first software component as prerequisite or corequisite software components, and of determining for each of said additional software components in said product dependency graph a corresponding installation facility;

a third step of transforming the product dependency graph into a process model executable by a Workflow Management System (WFMS), wherein said process model comprises a directed graph of activities, and wherein the transforming comprises translating dependencies between different ones of said additional software components in said product dependency graph into sequential and parallel execution paths in said process model, and wherein each of said additional software components of said product dependency graph is associated with an activity in said process model such that when each said activity is executed, an installation is performed by an installation facility corresponding to said each of said additional software components; and wherein a sequence of said activities in said directed graph does not violate the dependencies of said additional software components in said product dependency graph; and a fourth step of inserting said process model in said WFMS as said provisioning process.

2. The computerized method for automatically generating a provisioning process according to claim 1, wherein in said third step said process model is generated such that said directed graph of activities is imitating said product dependency graph.

3. The computerized method for automatically generating a provisioning process according to claim 1, wherein in said third step said process model is generated such that said directed graph of activities is a sequence generated by depth-first or breadth-first traversal of said product dependency graph.

4. The computerized method for automatically generating a provisioning process according to claim 1, wherein in said second step determining if a certain software component is accompanied by installation parameters, and wherein in said third step generating a scope definition in said process model comprising an activity associated with said certain software component and all activities associated with successor software components within said products dependency graph and said scope definition comprising said installation parameters.

5. The computerized method for automatically generating a provisioning process according to claim 1, wherein in said third step a subgraph of said directed graph of activities is generated as subprocess of said process model.

6. The computerized method for automatically generating a provisioning process according to claim 1, wherein in said second step determining for a software component in said product dependency graph a corresponding uninstall facility, and wherein in said third step for an activity in said process model a compensation activity is generated such that when said compensation activity is executed an uninstall facility is performed corresponding to a software component of said activity.

7. The computerized method for automatically generating a provisioning process according to claim 1,
wherein in said second step reducing said product dependency graph for software components already installed on said target system.

8. The computerized method for automatically generating a provisioning process according to claim 1,
wherein said request to install comprises all software components within said product dependency graph or a sub graph thereof.

9. A computerized method for automatically generating a provisioning process said provisioning process being capable to install at least one software component on a target system, said method comprising:
- a first step of receiving a request to install a first software component;
- a second step of determining a product dependency graph for said first software component, said product dependency graph identifying as a directed graph additional software components required by said first software component to be installed as prerequisite or corequisite software components, and of
- determining for each of said additional software components in said product dependency graph a corresponding installation facility, and
- determining for at least one of said additional software components in said product dependency graph a corresponding uninstall facility;
- a third step of transforming the product dependency graph into a process model executable by a Workflow Management System (WFMS), wherein said process model comprises a directed graph of activities that imitates said product dependency graph, and wherein the transforming comprises translating dependencies between different ones of said additional software components in said product dependency graph into sequential and parallel execution paths in said process model such that said directed graph of activities is a sequence generated by one of a depth-first or a breadth-first traversal of said product dependency graph, and
wherein each of said additional software components of said product dependency graph is associated with an activity in said process model such that when each said activity is executed, an installation is performed by an installation facility corresponding to said each of said additional software components, and wherein, for an activity in said process model, a compensation activity is generated such that when said compensation activity is executed, the uninstall facility is performed that corresponds to said at least one of said additional software components in said product dependency graph; and
wherein a sequence of said activities in said directed graph does not violate the dependencies of said additional software components in said product dependency graph; and
- a fourth step of inserting said process model in said WFMS as said provisioning process.

* * * * *